United States Patent [19]
Craig

[11] 3,744,917
[45] July 10, 1973

[54] OPTICAL COMPARISON DEVICE USING AN OPTICAL DIFFUSER

[75] Inventor: Dwin R. Craig, Gaithersburg, Md.

[73] Assignee: Symbionics, Inc., Annapolis, Md.

[22] Filed: May 14, 1971

[21] Appl. No.: 143,577

Related U.S. Application Data

[63] Continuation of Ser. No. 803,250, Feb. 28, 1969, abandoned.

[52] U.S. Cl................ 356/168, 350/30, 356/71
[51] Int. Cl.... G01b 11/24, G02b 21/20, G06k 9/08
[58] Field of Search.............. 350/30; 356/71, 168, 356/156, 165, 166

[56] References Cited
UNITED STATES PATENTS

| | | | |
|---|---|---|---|
| 2,460,350 | 2/1949 | Hinman | 356/166 |
| 2,674,152 | 4/1954 | Wilkinson | 356/168 |
| 2,898,801 | 8/1959 | Rockafellow | 356/168 X |

FOREIGN PATENTS OR APPLICATIONS

| | | | |
|---|---|---|---|
| 971,276 | 9/1964 | Great Britain | 356/168 |

OTHER PUBLICATIONS

Rottman, "Alignment Apparatus," IBM Tech. Disclosure Bltn., Vol. 10 No. 11, April, 68, pg. 1661–1662.

Primary Examiner—Ronald L. Wibert
Assistant Examiner—V. P. McGraw
Attorney—Birch, Swindler, McKie & Beckett

[57] ABSTRACT

A comparison device in which objects to be compared are arranged in side-by-side relation and when viewed through a mirror system are caused to appear as one object with each object being viewed by a respective one of the observer's eyes. A rotating shutter intermittently and successively interrupts the path of light to each eye so that the fused images are actually viewed successively rather than simultaneously. Differences in the objects being compared appear as pulses of the missing detail of the object.

4 Claims, 3 Drawing Figures

Patented July 10, 1973
3,744,917
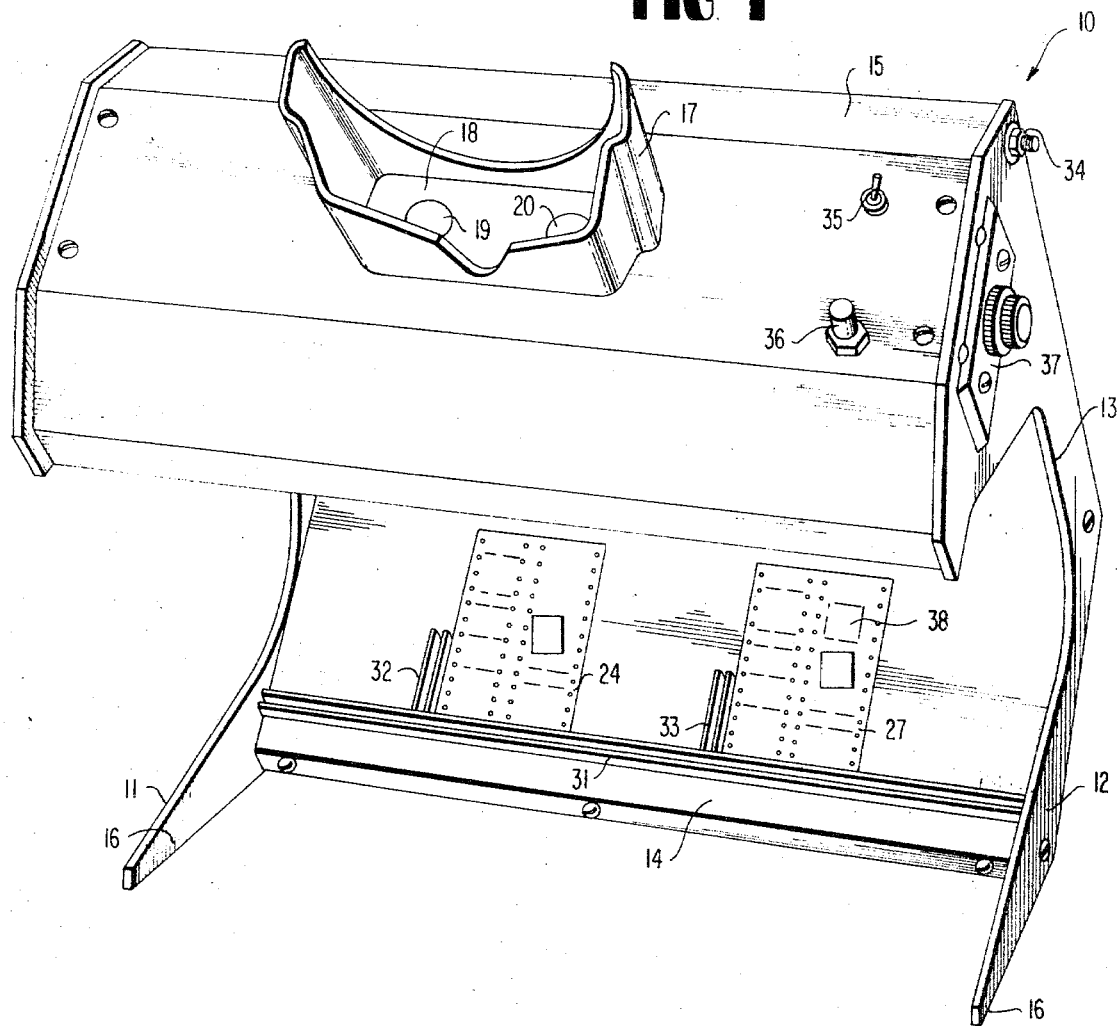
FIG. 1
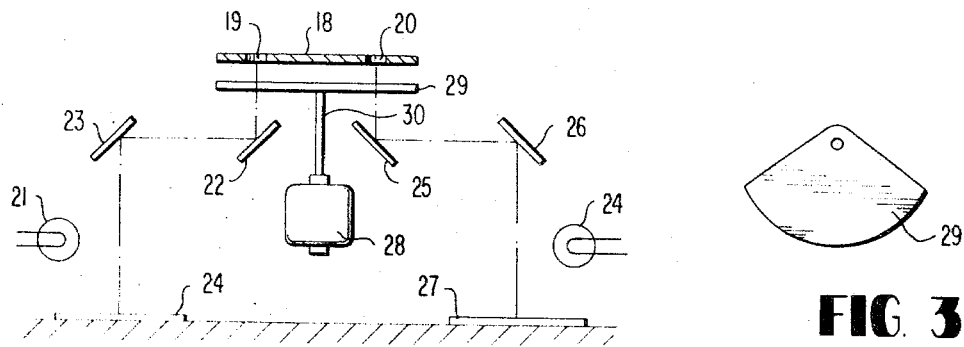
FIG. 2
FIG. 3

OPTICAL COMPARISON DEVICE USING AN OPTICAL DIFFUSER

RELATED APPLICATIONS

This application is a continuation of application Ser. No. 803,250, filed Feb. 28, 1969, now abandoned priority of which is claimed.

BACKGROUND OF THE INVENTION

1. Field of the Invention

The invention relates to the optical comparison of two objects, photographs, drawings and the like wherein one of the objects is compared to a standard object to determine if any differences exist between the objects being compared with the differences being identifiable by observation.

2. Description OF THE Prior Art

In prior art optical comparison devices, it has always been extremely difficult to pick out and identify distinctions between the standard and the object being compared since each of the objects was always visible to the respective eye. The closest observation by a skilled observer would often times result in inaccurately manufactured products being passed through the inspection stage and sold on the market with the inaccuracies going undetected.

Furthermore, even when sufficient skill is found in the inspector to observe any inaccuracies, the speed at which such inspections can be made is extremely slow.

SUMMARY OF THE INVENTION

The present invention is directed to an optical comparison device in which a standard object is arranged in side-by-side relation to an object to be compared to the standard. The objects images are viewed through a pair of spaced eye openings so that the two images appear to fuse into one image. A revolving shutter interrupts the light alternately from the two objects so that differences between the standard and the object being compared to the standard will appear as pulsations in the fused image.

BRIEF DESCRIPTION OF THE DRAWINGS

FIG. 1 is a perspective view of the invention;
FIG. 2 is a semi-diagrammatic view of the optical system of the invention; and
FIG. 3 is a plan view of the segmental shutter.

DESCRIPTION OF THE PREFERRED EMBODIMENT

Referring now to the drawings in detail wherein like reference characters indicate like parts throughout the several figures, the reference numeral 10 indicates generally an optical comparison device construction in accordance with the invention.

The optical comparison device 10 includes a pair of spaced apart parallel upright side walls 11, 12, which are connected by a back wall 13, a work support 14 of generally rectangular configuration, and a housing 15. The work support 14 slopes upwardly and rearwardly from the bottom edges 16 of the side walls 11, 12.

A hood 17 is secured to the housing 15 and is adapted to shield the eyes of the user from extraneous light. A board 18 is positioned within the hood 17 and has openings 19, 20 corresponding to the eyes of the observer. Within the housing 15 are mounted incandescent lights 21 to illuminate the work support 14 and the work thereon. A fixed mirror 22 underlies the eye opening 19 and is arranged at a 45° angle to the line of sight therethrough. A second mirror 23 is fixed at a 45° angle parallel to the mirror 22 and arranged to reflect light from a work piece 24 to the eye opening 19. A mirror 25 is arranged at a 45° angle and underlies the eye opening 20 cooperating with a mirror 26 also arranged at a 45° angle to reflect light from a work piece 27 to the eye opening 20. An electric motor 28 is positioned intermediate the eye openings 19, 20 and has a segmental shutter 29 secured to the shaft 30 thereof. The segmental shutter 29 is formed of translucent material which will diffuse the light rays projecting therethrough without reducing materially the level of light transmitted. A magnetic longitudinal straight edge support 31 is positioned on the work support 14 to support the lower edges of the work pieces 24, 27 and upright magnetic straight edge members 32, 33 are arranged to align the side edges of the work pieces 24, 27.

A switch control 34 is provided on the end wall 12 to control the incandescent lights 21 and a switch 35 is provided on the housing 15 for energizing the motor 28. A speed control member 36 is mounted on the housing 15 and controls the speed of the motor 28 so that the shutter 29 may be rotated at any desired speed. An electrical fitting 37 is provided on the end wall 12 to permit connection of the comparator 10 to a source of electricity.

In comparing objects having holes or apertures to be matched, the work support 14 would be made translucent with a light underlying the work support 14 to permit the back lighting of the objects being compared. With this system the outline shape of the objects can also be compared.

In the operation of the invention, an object 24 is positioned on the work support 14 as the standard so that it is in line with the mirror 23 to be viewed through the eye opening 19. An object 27 to be compared to the object 24 is positioned on the work support 14 underlying the mirror 26 to be viewed through an eye opening 20. The motor 28 is then energized and permitted to rotate at a relatively slow speed so that the image is alternately obscured in each eye of the observer. However, by using a transluscent shutter there is no material change in the quantity of light reaching the eye as the shutter 29 rotates. In the example shown in the drawing, the object 27 is identical to the object 24 with the exception that an extra block 38 appears thereon. The block 38 will be seen by the right eye as the shutter uncovers the eye opening 20 and will not be seen by the left eye as the shutter uncovers the eye opening 19. Hence, the block 38 will appear and disappear in a pulsing action such as to draw the attention of the observer thereto immediately when viewing the objects 24, 27. It should be noted that the shutter 29 when at rest uncovers both the eye openings 19, 20 to permit the object 27 to be accurately aligned with the object 24 prior to rotating the shutter 29.

Having thus described the preferred embodiment of the invention, it should be understood that numerous structural modifications and adaptations may be resorted to without departing from the spirit of the invention.

I claim:

1. An optical comparison device comprising support means for supporting first and second spaced apart objects, a housing positioned relative to said support and including a first and second spaced apart viewing apertures defining first and second optical channels, said first channel providing a view of said first object to said first viewing aperture, said second channel providing a view of said second object to said second aperture, an optical diffuser for diffusing the view of said objects provided by said first and second viewing channels, and means for actuating said diffuser to alternately diffuse the view of said first and second objects provided along said channels.

2. A device as claimed in claim 1, including means for supporting said diffuser adjacent said first and second optical channels, said diffuser shutter comprising a translucent of such limited extent as to thereby occupy a position adjacent to and non-interposed in said first and second channels which provide a view of said first and second objects.

3. A device as claimed in claim 1 wherein a mirror element is provided in each of said first and second channels for establishing each of said channels between said viewing aperture and said object.

4. A device as claimed in claim 1 including a hood mounted on said housing and surrounding said viewing apertures, whereby said apertures are shielded from ambient light.

* * * * *